United States Patent
Leonard et al.

(10) Patent No.: US 9,624,115 B2
(45) Date of Patent: Apr. 18, 2017

(54) RADIATION REACTOR

(71) Applicant: Ozone Industries Ireland Limited, Dublin (IE)

(72) Inventors: Owen Thomas Leonard, Dromahair (IE); Iain Lennox, Two Mile Water (IE)

(73) Assignee: Ozone Industries Ireland Limited, Newtownmountkennedy, Co. Wicklow (IE)

( * ) Notice: Subject to any disclaimer, the term of this patent is extended or adjusted under 35 U.S.C. 154(b) by 49 days.

(21) Appl. No.: 14/438,270

(22) PCT Filed: Oct. 24, 2013

(86) PCT No.: PCT/EP2013/072337
§ 371 (c)(1),
(2) Date: Apr. 24, 2015

(87) PCT Pub. No.: WO2014/064226
PCT Pub. Date: May 1, 2014

(65) Prior Publication Data
US 2015/0336809 A1  Nov. 26, 2015

(30) Foreign Application Priority Data
Oct. 24, 2012 (IE) .................................. S2012/0469

(51) Int. Cl.
C02F 1/32 (2006.01)
C02F 103/00 (2006.01)

(52) U.S. Cl.
CPC ........ *C02F 1/325* (2013.01); *C02F 2103/001* (2013.01); *C02F 2201/328* (2013.01); *C02F 2201/3223* (2013.01); *C02F 2303/04* (2013.01)

(58) Field of Classification Search
CPC ........ B01J 19/12; B01J 19/122; B01J 19/123; B01J 19/2405; B01J 2219/00058;
(Continued)

(56) References Cited

U.S. PATENT DOCUMENTS 7,658,891 B1 * 2/2010 Barnes .................... A61L 9/015
128/205.28
2008/0206095 A1   8/2008 Duthie
(Continued)

FOREIGN PATENT DOCUMENTS

EP  0202820 A2  11/1986
FR  1310471 A   11/1962
(Continued)

*Primary Examiner* — Walter D Griffin
*Assistant Examiner* — Cameron Allen
(74) *Attorney, Agent, or Firm* — Michael Crilly, Esquire (57) ABSTRACT

The present invention relates to radiation reactors for sanitizing fluids. In particular the present invention concerns a radiation reactor for a fluid, whereby the radiation reactor comprises a tubular casing having a fluid inlet and a fluid outlet, and, the radiation reactor also comprises a radiating element, with the radiation element being arranged within the tubular casing. As a fluid is passed into the tubular casing through the fluid inlet, a first direction of rotation is imparted to the fluid. The fluid is discharged from the tubular casing through the fluid outlet, after the fluid has been irradiated by the radiating element. In order to improve the efficiency of the irradiation process while maintaining flow rate through the radiation reactor, the tubular casing also comprises at least one protrusion on the inner wall of the casing and the protrusion extends into a flow path of the fluid such that the protrusion interrupts the first direction of rotation imparted to the fluid by directing the fluid out of the first direction of rotation.

18 Claims, 6 Drawing Sheets

(58) Field of Classification Search
CPC .. B01J 2219/00132; B01J 2219/001322; B01J 19/24; B01D 45/12; C02F 1/325; C02F 1/48; C02F 2303/22; C02F 2201/48; C02F 2301/024; C02F 2303/04; C02F 1/03; C02F 1/32; C02F 1/00; A61L 2/10; A61L 9/20
See application file for complete search history.

(56) References Cited

U.S. PATENT DOCUMENTS

| | | | |
|---|---|---|---|
| 2009/0145855 A1* | 6/2009 | Day | C02F 1/325 210/748.11 |
| 2012/0181235 A1* | 7/2012 | Leonard | E03B 3/02 210/747.2 |

FOREIGN PATENT DOCUMENTS

| | | |
|---|---|---|
| GB | 2404318 A | 1/2005 |
| GB | 2404319 A | 1/2005 |
| WO | 9210429 A1 | 6/1992 |
| WO | 02076517 A1 | 10/2002 |

* cited by examiner

RADIATION REACTOR

CROSS REFERENCE TO RELATED APPLICATIONS

This application is a national phase application based upon PCT Application No. PCT/EP2013/072337 filed Oct. 24, 2013 entitled A Radiation Reactor which claims priority to Irish Patent Application No. S2012/0469 filed Oct. 24, 2012 entitled An Ultra-Violet Radiation Reactor, which are hereby incorporated in their entirety by reference thereto.

FEDERALLY SPONSORED RESEARCH AND DEVELOPMENT

None.

BACKGROUND OF THE INVENTION

1. Field of the Invention

This invention relates to a radiation reactor. In particular, the present invention relates to a radiation reactor construction which is especially suited to the effective irradiation of a fluid passing through the radiation reactor.

2. Background

Throughout this specification, the term "radiation reactor" shall be understood to encompass any type of device comprising a light source whose radiation is used to irradiate, treat and/or react with a fluid, which fluid is directed through the device so as to pass within the radiation transmission range of the light source.

The radiation reactors of the present invention are typically used with ultra-violet light sources. These ultra-violet radiation reactors are used to perform a plurality of functions such as the generation of ozone, partial or full sanitisation of contaminated fluids and the like, in particular water, including rainwater, surface water, borehole water, well water and municipal water.

Ultra-violet radiation having a wavelength of approximately 254 nm is known to be ideal for the germicidal treatment of liquids. For example, rainwater carrying some potentially harmful impurities may be treated by subjecting the rainwater to ultra-violet radiation having a wavelength of approximately 254 nm. The radiation reactor of the present invention is envisaged to be used within a water treatment process and apparatus, such that the ultra-violet radiation from the ultra-violet light source, or ultra-violet lamp, irradiates and thus partially sanitises water which is passed through the ultra-violet radiation reactor.

The intensity of the ultra-violet radiation from an ultra-violet lamp decreases over distance. As a consequence it is preferable to subject the fluid to the ultra-violet radiation as close as possible to the ultra-violet lamp. Indeed, in many instances, for legal, regulatory and/or best practice reasons it will be essential for manufacturers of radiation reactors to ensure that the amount of radiation which a fluid passing through their radiation reactor is subjected to, is sufficiently high so as to meet with designated requirements. Taking the example of irradiating rainwater with UV light, in order for efficient UV radiation treatment of the rainwater to be adjudged to have taken place, it is generally recommended that the rainwater be subjected to ultra-violet radiation at a fluence rate of 40 mWs/cm$^2$ in accordance with best practice and current prevailing regulations, for example, USEPA Guide Standard and Protocol for Testing Microbiological Water Purifiers, April 2006.

An ultra-violet radiation reactor of the type referred to hereinbefore will typically comprise of an ultra-violet light source, alternatively referred to as an ultra-violet lamp, and a fluid receiving casing. The ultra-violet lamp will be mounted within the fluid receiving casing. In most instances the casing will be tubular and the ultra-violet lamp will be an elongated lamp or series of lamps. The ultra-violet radiation reactor will be installed in a vertical orientation with the longitudinal axes of both the tubular casing and the elongated ultra-violet lamp being co-axial and substantially vertical after installation of the ultra-violet radiation reactor.

As mentioned hereinbefore, the ultra-violet light source is generally co-axial with the liquid receiving tube so that the liquid can surround the ultra-violet light source as it flows along the length of the tube, thus increasing the exposure of the liquid to the ultra-violet light source. In essence, a substantially annular shape is created intermediate the ultra-violet elongated lamp and an inner wall of the tubular casing, through which annular space the fluid passes as it is passed through the ultra-violet radiation reactor.

In some cases, a protective quartz sleeve may be used to protect the ultra-violet lamp from damage through direct contact with the fluid. In such embodiments, it will be understood that the substantially annular space is thus created intermediate the protective sleeve and the inner wall of the tubular casing.

In order to subject the fluid to the ultra-violet radiation as close as possible to the ultra-violet lamp, the distance between the ultra-violet lamp and an outermost point within the substantially annular space created within the radiation reactor should be kept to a minimum by decreasing the distance as much as possible. However, in decreasing the distance between the ultra-violet light source and the outermost point within the substantially annular space, the width of the substantially annular space is decreased and this results in a narrowing of the channel through which the fluid must pass. Therefore the flow rate of the fluid through the ultra-violet reactor will be lowered; there is a trade-off between the flow rate of the fluid passing through the ultra-violet reactor and the effectiveness of the ultra-violet reactor in that a widening of the width of the annular space will increase the size of the channel through which the fluid will flow, but will also reduce the effectiveness of the radiation as the fluid at the outermost point within the substantially annular space will be subjected to a radiation with a lower intensity. If the fluid is subjected to too low an intensity, then prevailing legal, regulatory, certification and best practice requirements may not be met. The width of the annular space is therefore largely dictated by the necessary radiation intensity, and the overall diametric size of the tubular casing will be restricted accordingly. This restriction will lower the flow rate of the fluid through the radiation reactor.

To obviate the restriction on flow rates, it is known from the prior art to increase the flow rate by forcing the fluid through the ultra-violet reactor at a higher flow rate than would normally occur under normal system pressures, or under gravity. However, such a solution requires the ultra-violet reactor to be relatively long so that the fluid, which is flowing at a relatively high flow rate, is still exposed to a sufficient amount of ultra-violet radiation so that the fluid is treated. This is problematic as the ultra-violet reactor will increase in length and become less compact. The length of such relatively long reactors is also limited by the availability of ultra-violet lamps of sufficient length.

As it is preferable that the length of the ultra-violet reactor be minimised for compactness and indeed due to technical limitations involving ultra-violet lamps, it is desirable that the relatively high flow rate be achieved through short ultra-violet reactors which do not suffer from ineffective ultra-violet radiation treatment problems mentioned above.

A number of solutions have been proposed to achieve relatively high flow rates through relatively short ultra-violet radiation reactors, without suffering from ineffective or insufficient ultra-violet radiation.

An example of an ultra-violet radiation reactor, which has been designed to increase the effectiveness of the ultra-violet radiation, can be found in PCT Patent Publication Number WO92/10429 (KLAUSEN). PCT Patent Publication Number WO92/10429 discloses an ultra-violet irradiator which comprises an ultra-violet lamp inserted inside of a quartz tube, which in turn is mounted within the irradiator. The quartz tube is used to protect the ultra-violet lamp from damage by the liquid. Ultra-violet radiation emitted from the ultra-violet lamp passes through the quartz tube and irradiates liquid which passes between the quartz tube and the outer casing of the irradiator. The liquid is fed into the irradiator through an inlet pipe and is directed around the quartz tube in a helical path by a helicoid guide plate. As the helicoid guide plate causes the liquid to travel in a helical path around the lamp, it is claimed that the liquid is effectively disinfected. The helicoid guide plate extends across between the quartz tube and the outer casing of the irradiator such that it defines a spiral channel which the liquid flows within. This spiral channel effectively increases the length of the flow channel within the tubular casing and causes the fluid passing through the channel to be exposed to the radiation for a longer period of time than would otherwise have been the case if the fluid passed straight through the outer casing.

A problem with the ultra-violet irradiator disclosed in PCT Patent Publication Number WO92/10429 is that as the liquid is passed around the quartz tube, the liquid which is at, diametrically speaking, outer parts of the spiral channel, will travel at faster rates than the liquid at inner parts of the spiral channel, due to the centrifugal effect acting on the liquid. Therefore, the liquid in these outer parts of the spiral channel will spend less time in the radiation reactor. Moreover, as the intensity of the ultra-violet radiation from the lamp decreases over distance, the liquid at these outer parts of the helical path, travelling at faster rates and spending less time in the radiation reactor, will also be subjected to ultra-violet radiation of lower intensity than the liquid at inner parts of the spiral channel. As a consequence, the liquid at the outer parts of the spiral channel will not be subjected to the same amount of ultra-violet radiation as the liquid at the inner parts of the helical path, because the liquid at the outer parts of the helical path will flow through the irradiator faster and will also be subjected to ultra-violet radiation of lower intensity.

Ultra-violet reactors using spiral pathways and spiral channels are also disclosed in U.K. Patent Publication Number GB 2404318A and GB 2404319A (both in the name of JOHN MANUFACTURING LIMITED). GB 2404318A discloses a combination photo-electronic water purifier comprising a UV irradiator within a housing. The water purifier comprises a rifled channel which stretches all the way through the housing. The water purifier disclosed is defined to be rifled in the sense that it comprises a plurality of generally helical ribs which project into the treatment chamber between the sheath which protects the UV light tube and the cylindrical bore of the housing, so as to produce a spiral motion in the water flowing along the annular treatment chamber from an inlet of the water purifier to an outlet of the water purifier. GB 2404319A discloses a combination photo-electronic air purifier comprising a negative ion generator, a UV irradiator and an illuminator, switched on or off by an infra-red remote control. The air purifier has a rifled air duct, where an extreme-UV light tube is fitted inside the rifled channel. The rifled channel causes the air to spiral around the UV light tube.

Both GB 2404318A and GB 2404319A describe indentation or protrusions which are used to cause a spiraling motion to the fluid passing through the reactor. This spiraling motion causes the fluid at outermost parts of the casing of the reactors to flow at faster rates in comparison with the fluids at more centrally located parts of the casing. This is due to the centrifugal effect acting on the fluids as there are spiraled around the reactors due to the indentations and protrusions. Therefore, the fluids in the outer parts spend less time in the radiation reactor, and, are subjected to radiation of a lower intensity. Thus, the fluids at the outer parts of the casing which are spiraling around as a result of the design of the casings will not be subjected to the same amount of radiation as a result of flowing through the reactor faster and being subjected to radiation of a lower intensity.

Another example of a radiation reactor is shown in PCT Patent Publication Number WO02/076517 A1 (TISSI). PCT Patent Publication Number WO02/076517 discloses a device for the sterilisation and/or purification of a fluid. In particular, the device is designed to be used on fluids which are part of a compressed or forced air flow. The device has a casing and at least one ultra-violet radiation lamp housed inside the casing. The device is designed to be compact in size whilst also increasing the time during which the fluid flowing through the device will be exposed to the sterilising action of the ultra-violet radiation lamp. To achieve this, the casing of the device houses so-called "conveying means". The conveying means is helicoidally wound coaxially around a tubular element which protects the ultra-violet radiation lamp. The conveying element is wound around the tubular element for substantially the entire length of the tubular element. In this manner, a spiral-shaped channel is created for the fluid to flow through.

As before, due to the use of a spiral channel, the fluid flowing around the spiral channel will spend a longer amount of time within the device, however, the fluid particles at the outer portions of the spiral-shaped channel, adjacent the casing, will travel faster due to the centrifugal forces acting upon them, whilst at the same time, those faster moving particles will be subjected to radiation of a lower intensity due to their distance from the ultra-violet lamp. As before, these particles will thus spend less time in the reactor and will be exposed to lower intensity radiation, and it is therefore possible that the particles will not be sufficiently irradiated or treated so as to meet with legal, regulatory, certification or best practice requirements in a jurisdiction.

The problems which are found with the ultra-violet irradiators disclosed in PCT Patent Publication Number WO92/10429, U.K. Patent Publication Number GB 2404318A, U.K. Patent Publication Number GB 2404319A, and, PCT Patent Publication Number WO02/076517 are also experienced in radiation reactors which do not have spiral channels, but do have rotational flow of the fluid within the radiation reactor casing due to, inter alia, a tangentially arranged fluid inlet.

Tangentially arranged fluid inlets are preferable for imparting a velocity to the fluid entering the radiation reactor so as to create a relatively high flow rate through the radiation reactor. In the cases where a fluid enters a radiation reactor, tangentially through an inlet that is of small diameter relative to the radiation reactor casing, it has been observed that the fluid adjacent outer walls of the reactor casing tends to flow rapidly through the reactor with a relatively low exposure to the radiation. Whereas, fluid near a central longitudinal axis of the radiation reactor casing will tend to be prohibited from flowing out of the reactor due to an upwelling of the fluid in a central portion of the substantially annular space within the radiation reactor casing. Thus, radiation reactors with tangentially arranged fluid inlets suffer the same problems regarding the effectiveness of the radiation of the fluids passing through such radiation reactors.

It is known that in typically annular UV irradiation systems that "UV shadowing" may occur. UV shadowing occurs where micro-organisms can be protected from the effects of the UV irradiation by the fact that they may be attached to or behind UV non-transparent particles and are therefore protected or shadowed from the UV irradiation by the particle. The result is that they may not receive the correct dose of UV irradiance to cause their inactivation and may therefore pass through the UV reactor in an active living state.

It is a goal of the present invention to provide a radiation reactor which overcomes at least one or more of the above mentioned problems. In particular, it is desired to design a radiation reactor which allows relatively quick flow rates, with compact design and can still ensure sufficient and proper radiation of fluids passing through the reactor.

It is a further goal of the present invention to provide a method of radiating a fluid in a radiation reactor which overcomes at least one or more of the above mentioned problems. In particular, it is desired to provide a method of radiating a fluid which allows relatively quick flow rates through the radiation reactor, with a relatively compact design of the reactor whilst still ensuring sufficient and proper radiation of fluids passing through the reactor.

SUMMARY OF THE INVENTION

The present invention is directed towards a radiation reactor for a fluid, whereby the radiation reactor comprises a tubular casing and a radiating element, with the radiation element being arranged within the tubular casing such that a substantially annular space is created intermediate the radiating element and an inner wall of the tubular casing; the tubular casing further comprising a fluid inlet and a fluid outlet, whereby a fluid is passed into the substantially annular space of the tubular casing through the fluid inlet and the fluid is discharged from the substantially annular space of the tubular casing through the fluid outlet, with the fluid being irradiated by the radiating element within the tubular casing as the fluid passes through the substantially annular space of the tubular casing from the fluid inlet towards the fluid outlet; wherein, a first direction of rotation is imparted to the fluid as it is passed into the substantially annular space of the tubular casing; the tubular casing comprising at least one protrusion on the inner wall, said protrusion extending into the substantially annular space; wherein, the protrusion interrupts the first direction of rotation imparted to the fluid so as to direct the fluid out of the first direction of rotation.

In other words the invention is characterised in that the protrusion is adapted to impede or resist the flow of fluid along the inner wall of the casing between the fluid inlet and the fluid outlet. It slows the passage of fluid along the inner wall to allow a greater irradiation of the fluid during passage through the reactor.

The advantage of providing the protrusion so as to interrupt the first direction of rotation imparted to the fluid and thereby direct the fluid out of the first direction of rotation is that a good mixing effect within the tubular casing is achieved. Fluid adjacent an inner wall of the tubular casing is propelled out of the first direction of rotation and back towards a longitudinal axis of the tubular casing. This ensures that fluid particles do not travel through the tubular casing along a path which is adjacent the inner wall of the tubular casing as they pass from the fluid inlet to the fluid outlet.

The good mixing effect is established by creating multiple fluid flow rates across a transverse cross-section of the tubular casing. For example, the flow rate of the fluid particles adjacent the inner wall of the tubular casing is slowed by the protrusion as a result of the protrusion acting as a barrier, whilst the fluid particles towards the centre of the tubular casing are accelerated as the relatively fast flowing fluid particles adjacent the inner wall of the tubular casing are diverted back towards the centre of the tubular casing. This effect of directing the relatively fast flowing fluid particles from adjacent the inner wall of the casing backs inwards towards the longitudinal axis of the tubular casing, also referred to as the centre of the tubular casing, is that the upwelling effect occasionally experienced by fluids in the prior art reactors is mitigated by the fluid particles adjacent the inner wall of the tubular casing being directed inwards and upwards within the tubular casing. This counters the upwelling effect as faster flow rates are observed closer to the longitudinal axis of the tubular casing and upwelling is prevented.

In a further embodiment, the protrusion is a helical protrusion, and the direction of rotation of the helical protrusion opposes the first direction of rotation imparted to the fluid so as to interrupt the first direction of rotation imparted to the fluid.

In a further embodiment, the helical protrusion is a continuous protrusion arranged along a helical path. In a further embodiment, the helical protrusion is a plurality of discrete protrusions arranged along a helical path.

In a further embodiment, the fluid inlet is arranged tangentially to the tubular casing so as to impart the first direction of rotation to the fluid.

In a further embodiment, the protrusion extends into the substantially annular space by a distance which is in the range of 35% to 55% of the distance intermediate the radiating element and an inner wall of the tubular casing. In a further embodiment, the protrusion extends into the substantially annular space by a distance equal to substantially 45% of the distance intermediate the radiating element and an inner wall of the tubular casing. The advantage of arranging the protrusion to a depth in the range of 35% to 55% of the distance intermediate the radiating element and an inner wall of the tubular casing is that the effectiveness of the radiation can be increased by ensuring a good mixing of the fluid particles through the tubular casing, whilst also ensuring a flow rate through the reactor which is sufficiently high to meet with the flow rate requirements of a larger treatment process such as a water treatment apparatus, where other component parts are connected with the radiation reactor to make up the overall treatment device/apparatus. The aim of the counter spiral is that the fluid flow must cross the protrusions. If the protrusion too much, then there is a minimal space for this to happen. If the protrusion is too shallow, then the redirection effect will be inadequate and fast tracking down the outer edge will dramatically reduce effectiveness of the germicidal treatment.

In a further embodiment, the protrusion is a helically-shaped plate. In a further embodiment, the protrusion is a helically-shaped semi-cylinder. In a further embodiment, the protrusion is a helically-shaped round bar. In a further embodiment, the protrusion is a helically-shaped square bar. In a further embodiment, each of the plurality of discrete protrusions is fin-shaped.

In a further embodiment, the protrusion is a helically-shaped triangular prism. In a further embodiment, the helically-shaped triangular prism comprises an upper face which forms an angle of between 90° and 110° with the inner wall of the tubular casing, and, a lower face which forms an angle of between 10° and 30° with the inner wall of the tubular casing. This arrangement has been found to be particularly effective at causing a mixing effect within the radiation reactor.

In a further embodiment, the tubular casing further comprises a protective sleeve, and the radiating element is arranged within the protective sleeve and the substantially annular space through which the fluid flows is created intermediate the protective sleeve and the inner wall of the tubular casing.

In a further embodiment, the radiation reactor is arranged within a water treatment apparatus for treatment of water for drinking comprising an inlet filter, an aerator, an outlet filter and the radiation reactor.

In a further embodiment, a pitch of the helical protrusion is substantially constant along the length of the tubular casing. In a further embodiment, a pitch of the helical protrusion shortens along the length of the tubular casing from the fluid inlet towards the fluid outlet. In a further embodiment, a pitch of the helical protrusion lengthens along the length of the tubular casing from the fluid inlet towards the fluid outlet.

In a further embodiment, a pitch of the helical protrusion is substantially equal to the distance intermediate on innermost point of the protrusion and a diametrically opposed point on the inner wall of the tubular casing.

In a further embodiment, the tubular casing is constructed of a mouldable plastics material, and the protrusion extending from an inner wall of the tubular casing is created by causing an indentation on an outer wall of the mouldable plastics material tubular casing.

In a further embodiment, the tubular casing is constructed of a mouldable plastics material, coated internally with a metallic or ceramic or glass or other such UV reflective coating, and the protrusion extending from an inner wall of the tubular casing is created by causing an indentation on an outer wall of the mouldable plastics coated with a metallic or ceramic or glass or other such UV reflective coating, material tubular casing.

In a further embodiment, the radiating element is an ultra-violet lamp and the fluid is water. In a further embodiment, the radiating element is an elongated ultra-violet lamp and the fluid is water which is to be partially sanitised by ultra-violet radiation from the elongated ultra-violet lamp.

The present invention is further directed towards a method for irradiating a fluid using a radiation reactor, whereby the radiation reactor comprises a tubular casing and a radiating element, with the radiation element being arranged within the tubular casing such that a substantially annular space is created intermediate the radiating element and an inner wall of the tubular casing, the method comprises the steps of feeding the fluid into the substantially annular space within a tubular casing through a fluid inlet, wherein a first direction of rotation is imparted to the fluid as it is fed into the substantially annular space of the tubular casing; radiating the fluid using the radiating element within the tubular casing as the fluid passes through the substantially annular space of the tubular casing from the fluid inlet towards a fluid outlet; and, discharging the fluid from the substantially annular space of the tubular casing through the fluid outlet; wherein, the method further comprises the step of interrupting the first direction of rotation imparted to the fluid by using at least one protrusion on an inner wall of the tubular casing whereby the protrusion extends into the substantially annular space so as to direct the fluid out of the first direction of rotation.

The same advantages as presented hereinbefore apply to the method of irradiating a fluid using a radiation reactor in accordance with an embodiment of the present invention.

In a further embodiment, the protrusion is a helical protrusion, and the direction of rotation of the helical protrusion opposes the first direction of rotation imparted to the fluid so as to interrupt the first direction of rotation imparted to the fluid.

In a further embodiment, the helical protrusion is a continuous protrusion arranged along a helical path. In a further embodiment, the helical protrusion is a plurality of discrete protrusions arranged along a helical path.

In a further embodiment, the fluid inlet is arranged tangentially to the tubular casing so as to impart the first direction of rotation to the fluid.

In a further embodiment, the protrusion extends into the substantially annular space by a distance which is in the range of 35% to 55% of the distance intermediate the radiating element and an inner wall of the tubular casing. In a further embodiment, the protrusion extends into the substantially annular space by a distance equal to substantially 45% of the distance intermediate the radiating element and an inner wall of the tubular casing.

In a further embodiment, the protrusion is a helically-shaped plate.

In a further embodiment, the protrusion is a helically-shaped triangular prism. In a further embodiment, the helically-shaped triangular prism comprises an upper face which forms an angle of between 90° and 110° with the inner wall of the tubular casing, and, a lower face which forms an angle of between 10° and 30° with the inner wall of the tubular casing.

In a further embodiment, the tubular casing further comprises a protective sleeve, and the radiating element is arranged within the protective sleeve and the substantially annular space through which the fluid flows is created intermediate the protective sleeve and the inner wall of the tubular casing.

In a further embodiment, a pitch of the helical protrusion is substantially constant along the length of the tubular casing. In a further embodiment, a pitch of the helical protrusion shortens along the length of the tubular casing from the fluid inlet towards the fluid outlet.

In a further embodiment, a pitch of the helical protrusion lengthens along the length of the tubular casing from the fluid inlet towards the fluid outlet. In a further embodiment, a pitch of the helical protrusion is substantially equal to the distance intermediate on innermost point of the protrusion and a diametrically opposed point on the inner wall of the tubular casing.

The present invention is further directed towards an ultra-violet radiation reactor comprising an ultra-violet light source housed within a casing, whereby, the casing is substantially tubular in shape and comprises a fluid inlet adjacent one end of the substantially tubular casing and a fluid outlet adjacent an opposing end of the substantially tubular casing; the fluid inlet being arranged such as to cause a rotational flow of the fluid, about a longitudinal axis of the casing, as the fluid passes through the casing; wherein, the casing further comprises a helically-shaped protrusion along its inner surface, the helically-shaped protrusion directed inwardly towards the ultra-violet light source, and, the helically-shaped protrusion having a direction of rotation which opposes the direction of rotation of the fluid.

The advantage of providing the helically-shaped protrusion with a direction of rotation which opposes the direction of rotation of the fluid is that the helically-shaped protrusion causes a good mixing effect within the casing such that fluid adjacent the inner surface of the casing is propelled back towards the longitudinal axis of the casing. This ensures that fluid particles do not continually remain adjacent the inner surface of the casing as they pass through the casing from the fluid inlet to the fluid outlet.

Advantageously, there are multiple fluid flow rates established in a transverse cross section of the casing. Moreover, the flow rate of the fluid adjacent the inner surface of the casing is slowed by the helically-shaped protrusion as a result of the protrusion itself acting as a barrier. Furthermore, by propelling the relatively fast flowing fluid adjacent the inner surface of the casing back towards the ultra-violet light source, the relatively slower flowing fluid in the centre of the casing is accelerated.

In the case where upwelling of the fluid occurred in the centre of the casing, the use of the helically-shaped protrusion having a direction of rotation which opposes the direction of rotation of the fluid eradicates, or largely eradicates, this upwelling movement of the fluid. It has been found that the outer fluid is directed inwards and upwards within the casing, countering the tendency for fast fluid flow adjacent the inner surface of the casing. This effect counters the upwelling so that the fastest flow rate of the fluid can happen closer to the longitudinal axis of the casing where there is a high ultra-violet fluence rate, increasing the effectiveness of the ultra-violet reactor in comparison with a straight-walled reactor casing, or spiraled reactor path as are known from the prior art.

In a further embodiment, the helically-shaped protrusion along the inner surface of the casing is formed by a helically-shaped indentation along an outer surface of the casing.

In a further embodiment, the helically-shaped protrusion along the inner surface of the casing is formed by a helicoid depending inwardly from the inner surface of the casing.

In a further embodiment, the ultra-violet light source comprises an elongated lamp which is housed within the casing such that the elongated lamp is substantially co-axial with the casing.

In a further embodiment, the fluid inlet and the fluid outlet are substantially orthogonal to the longitudinal axis of the substantially tubular casing.

In a further embodiment, the fluid inlet and the fluid outlet are substantially orthogonal to the longitudinal axis of the substantially tubular casing, and, the fluid inlet being offset such as to be tangentially arranged on the casing.

In a further embodiment, the helically-shaped protrusion comprises a substantially wedge-shaped cross-section.

In a further embodiment, the helically-shaped protrusion comprises a substantially wedge-shaped cross-section, whereby an upper face of the protrusion having the wedge-shaped cross-section is arranged at an angle of between 110° and 90° from the inner surface of the casing.

The advantage of providing the helically-shaped protrusion comprises a substantially wedge-shaped cross-section which has an upper face arranged at an angle of between 110° and 90° from the inner surface of the casing is that the fluid is urged back towards the longitudinal axis of the casing, which is to say back inwardly towards the ultra-violet light source.

In a further embodiment, the helically-shaped protrusion is directed inwardly to a distance of between 35% and 55% of the distance from the inner surface of the casing and the ultra-violet light source. Preferably, the helically-shaped protrusion is directed inwardly to a distance of 45% of the distance from the inner surface of the casing and the ultra-violet light source.

The advantage of extending the helically-shaped protrusion inwardly to a distance of between 35% and 55% of the distance from the inner surface of the casing and the ultra-violet light source is that the helically-shaped protrusion urges and propels the fluid inwardly whilst maintaining a clear pathway along the length on the casing adjacent its longitudinal axis. This allows for efficient through flow.

In a further embodiment, the pitch of the helically-shaped protrusion is substantially equal to an internal diameter of the helically-shaped protrusion.

In a further embodiment, the ultra-violet radiation reactor further comprises a protective quartz sleeve having a diameter greater than the ultra-violet light source and less than the casing, such that the ultra-violet light source is housed within the protective quartz sleeve, which in turn is mounted within the substantially tubular casing.

In a further embodiment, the helically-shaped protrusion is directed inwardly to a distance of between 35% and 55% of the distance from the inner surface of the casing and the protective quartz sleeve.

In a further embodiment, the casing is constructed from a mouldable plastics material. It will be readily understood that any number of constructions materials such as, inter alia, stainless steel, alloy metals, polymeric materials and any combination thereof. Ideally the inner surface is coated with a UV reflective coating as previously described.

The present invention is further directed to an ultra-violet reactor comprising an ultra-violet lamp housed within a casing, whereby, the casing is arranged such as to cause a rotational flow of the fluid, about an axis of the casing; wherein, the casing further comprises a helically-shaped protrusion directed inwardly with a direction of rotation which opposes the direction of rotational flow of the fluid.

The present invention is yet further directed to an ultra-violet radiation reactor for irradiation of rainwater, the ultra-violet radiation reactor comprising an elongated ultra-violet lamp housed within a protective quartz sleeve; the protective quartz sleeve mounted with a substantially tubular casing; the substantially tubular casing comprising a tangentially arranged fluid inlet port adjacent a one end of the substantially tubular casing and a fluid outlet port adjacent an opposing end of the substantially tubular casing; the inlet and the outlet being arranged such as to cause a rotational flow of the fluid between the protective quartz sleeve and the casing as the fluid passes through the casing; wherein, the casing further comprises a helically-shaped protrusion depending inwardly from its inner surface towards the protective quartz sleeve with the helically-shaped protrusion having a direction of rotation which opposes the direction of rotation of the fluid.

The present invention is further directed towards a radiation reactor for a fluid, whereby the radiation reactor comprises a tubular casing having a fluid inlet and a fluid outlet, and, the radiation reactor also comprises a radiating element, with the radiation element being arranged within the tubular casing; whereby, as the fluid is passed into the tubular casing through the fluid inlet, a first direction of rotation is imparted to the fluid, and, the fluid is discharged from the tubular casing through the fluid outlet after the fluid has been radiated by the radiating element; such that, the tubular casing also comprises at least one protrusion on the inner wall of the casing with the protrusion extending into a flow path of the fluid wherein the protrusion interrupts the first direction of rotation imparted to the fluid by directing the fluid out of the first direction of rotation.

BRIEF DESCRIPTION OF THE INVENTION

The invention will be more clearly understood from the following description of some embodiments thereof, given by way of example only, with reference to the accompanying drawings.

It will be appreciated that the drawings have not be made to scale, nor has every component part necessary for operation of each embodiment been shown in order to highlight and focus on the features at the crux of the present invention. Standard engineering techniques and manufacturing processes may need to be applied to the features shown in the embodiments in order to arrive at a fully functioning radiation reactor; however, such engineering techniques and manufacturing processes would be well within the scope of a person skilled in the art of the manufacture of radiation reactors.

DETAILED DESCRIPTION OF THE INVENTION

Figure 1:
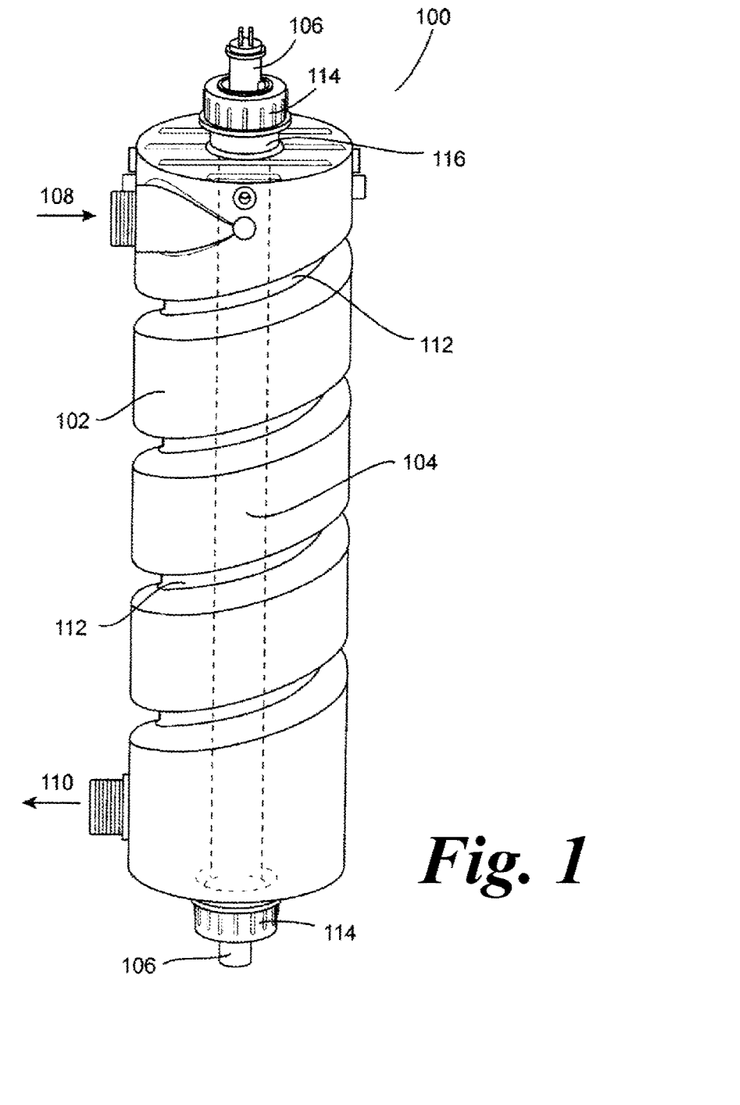
FIG. 1 is a perspective view of a radiation reactor in accordance with the present invention.

Referring to FIG. 1, there is provided a radiation reactor indicated generally by reference numeral 100. Throughout the description, the radiation reactor 100 is referred to as an ultra-violet radiation reactor 100, although it will be appreciated that other types of light-based irradiators may be used which also provide a sterilising, sanitising, and/or cleansing effect.

The ultra-violet radiation reactor 100 comprises a substantially tubular casing 102 which houses a substantially elongated ultra-violet light source 106, whereby the elongated ultra-violet light source 106 is co-axial with the tubular casing 102 along the longitudinal axes of the elongated ultra-violet light source 106 and the tubular casing 102. The ultra-violet light source 106 is provided within a protective sleeve 104 which is preferably made of quartz and is transparent to at least a portion of the ultra-violet radiation which is emitted by the ultra-violet light source 106, whereby the portion of the ultra-violet radiation which passes through the protective sleeve 104 is ultra-violet radiation of a wavelength suitable for the treatment and/or irradiation of a fluid passing through the ultra-violet radiation reactor 100. The protective sleeve 104 prevents the fluid flowing through the casing 102 from coming into direct contact with the ultra-violet light source 106.

The ultra-violet radiation reactor 100 comprises a fluid inlet 108 adjacent a top and a fluid outlet 110 adjacent a bottom of the ultra-violet radiation reactor 100. The fluid inlet 108 and the fluid outlet 110 may be alternatively arranged in reverse such that the fluid inlet 108 is adjacent a lowermost end of the ultra-violet radiation reactor 100 and the fluid outlet 110 is arranged adjacent an uppermost end of the ultra-violet radiation reactor 100. In the present embodiment, the fluid inlet 108 is offset so as to be tangentially mounted on the casing 102. The fluid outlet 110 is not necessarily offset so as to be tangentially mounted on the casing 102. This arrangement causes a fluid flowing through the casing 102 to do so with a first direction of rotation through the tubular casing 102. It will be understood that other arrangements and constructions of the fluid inlet 108 may be used, as is known in the art, so as to cause rotational movement of the fluid through the substantially tubular casing 102. For example, a deflector plate may be arranged within the tubular casing 102 adjacent a non-tangentially arranged fluid inlet, which deflector plate imparts a rotational flow to the fluid which enters through the non-tangentially arranged fluid inlet and is deflected into a rotational flow path. Alternatively, a rotational flow path may be encouraged by pumping the fluid into the tubular casing 102 under pressure which causes a rotational flow to be established. In yet another alternative, it is envisaged that an upper portion of the tubular casing 102 may be designed with a helical or spiral protrusion which causes a rotational flow path to be created in the same direction as the helical or spiral protrusion; and, at a lower portion of the tubular casing 102, a protrusion in accordance with the present invention, which is detailed further hereinunder, is provided to oppose and interrupt the rotational flow of the fluid.

The ultra-violet radiation reactor 100 comprises a helically-shaped protrusion 112 which is arranged along an inner surface of the casing 102. The helically-shaped protrusion 112 is directed inwardly towards the protective sleeve 104 and the ultra-violet light source 106. The helically-shaped protrusion 112 has a direction of rotation which opposes the direction of rotation of the fluid flowing through the ultra-violet reactor 100. It will be understood that the protrusion 112 may not necessarily be helical in shape and that any protrusion 112 which interrupts the first direction of rotation imparted to the fluid upon entry into the casing 102 so as to direct the fluid out of the first direction of rotation may be used.

O-rings (not shown) and lock nuts 114 are used in a conventional manner with neck portions 116 of the casing 102 to ensure that the protective sleeve 104 maintains an impermeable barrier between fluid passing between the protective sleeve 104 and an inner surface of the casing 102 and the ultra-violet light source 106. It will be appreciated that the problem of "UV shadowing" is overcome by creating turbulence in the flow of the fluid through the casing 102 such that organisms and their shadowing particles are rotated in the turbulent fluid flow, thus ensuring that they receive the correct UV irradiation dose at some point during their movement through the UV reactor 100.

Figure 2:
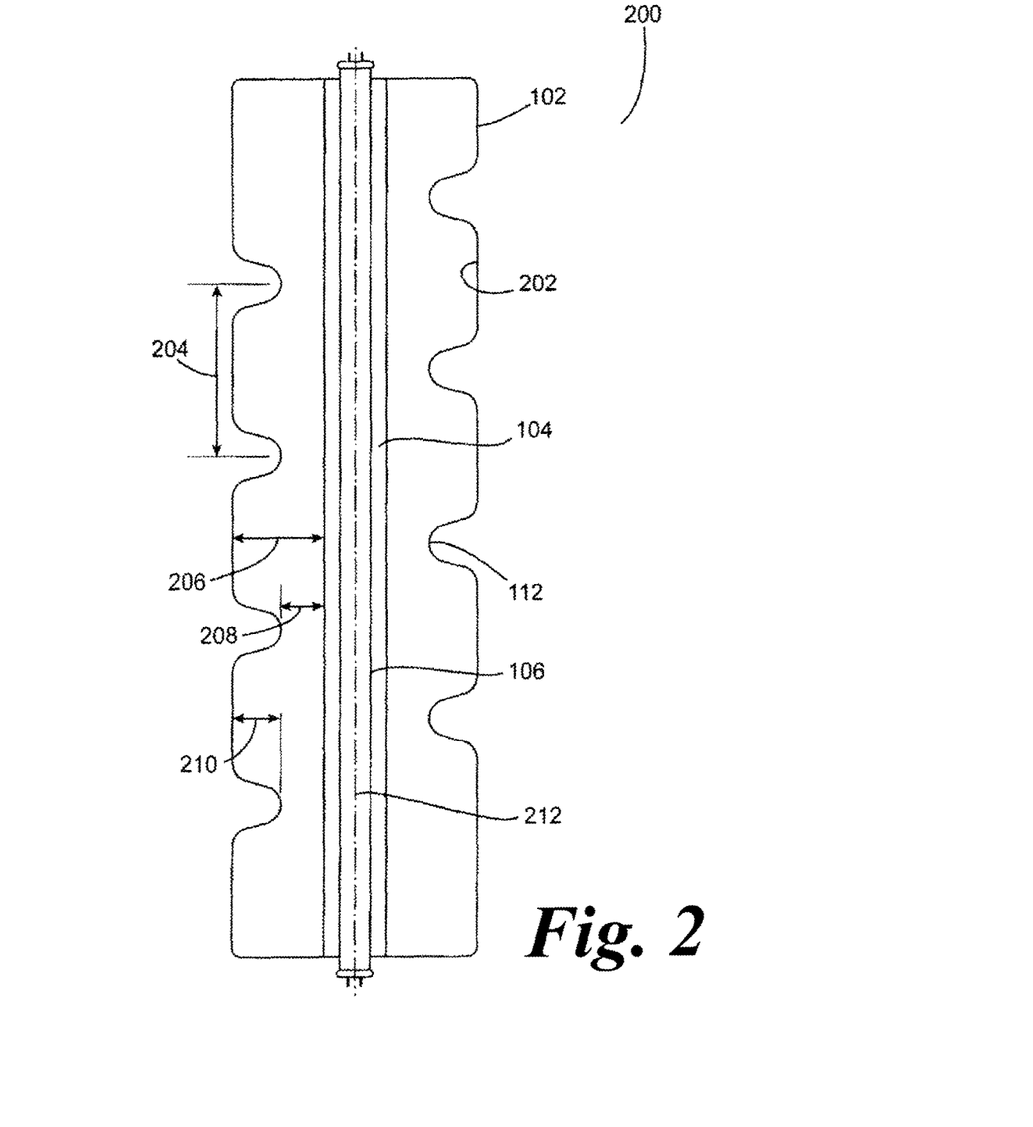
FIG. 2 is a diagrammatic cross-sectional side view of some component elements of a radiation reactor in accordance with an embodiment of the present invention.

With reference to FIG. 2, wherein like parts previously described have been assigned the same reference numerals, there is shown the principle component parts of an ultra-violet radiation reactor indicated generally by reference numeral 200. The ultra-violet radiation reactor 200 comprises a casing 102 and a protective sleeve 104 housing an elongated ultra-violet lamp 106. An inner wall 202 of the substantially tubular casing 102 comprises a helically-shaped indentation which forms the helically-shaped protrusion 112 around the casing 102. The pitch 204 of the helically-shaped protrusion 112 is substantially equal to the diametrically measured distance from an innermost point on the helically-shaped protrusion 112 to a diametrically-opposed point on the inner wall 202 of the casing 102.

The distance 206 intermediate the inner wall 202 of the tubular casing 102 and the protective sleeve 104 is the width of a substantially annular transverse cross sectional space which is created between the protective sleeve 104, or the ultra-violet light source 106 in the case that there is no protective sleeve 104, and the inner wall 202 of the tubular casing 102. The fluid passes through this substantially annular space as it is treated. The depth of extension 210 of the helically-shaped protrusion 112 into the substantially annular space is arranged to be in the range of 35% and 55% of the distance 206 intermediate the inner wall 202 of the casing 102 and the protective sleeve 104. Preferably, the depth of extension 210 of the helically-shaped protrusion 112 is substantially 45% of the distance 206 intermediate the inner wall 202 of the casing 102 and the protective sleeve 104. Thus the distance 208 from an innermost point on the helically-shaped protrusion 112 to the protective sleeve 104 is between 65% and 45% of the distance 206 between the inner surface 202 of the casing 102 and the protective sleeve 104. The longitudinal axis 212 of the casing 102 is also shown.

It will be noted that the offset inlet sets up a spiraling rotating flow as described above. A counter spiral protrusion from the outer wall is used to counteract the tendency to fast tracking at the outer wall and upwelling at the central axis. The counter spiral ensures that the fluid flow must cross the spiral at several points during transit of the treatment vessel. When fluid flow encounters the protrusion it is deflected upwards, counteracting the tendency to fast track down the outside edge where the UV intensity is weakest. This upward deflection at the outer edges also counters the central axis upwelling that would otherwise result from unimpeded rotational flow. The result is a more even distribution of UV dose across all the routes possible through the treatment vessel, and the higher UV dose for the fasted transit routes. This is fundamentally different to spirals described in previously referenced patents. The previous spirals went in the same direction as the fluid flow, with the aim of preventing fast tracking. They would need to extend the full distance from quartz sleeve to outer wall to be effective, which results in a significant loss of treatment volume and reduction in UV dose due to shadowing unless the spiral is formed from a highly UV reflective material. The protrusion of present invention runs counter to the fluid flow, forcing the fluid to cross the spiral and be directed inwards or upwards, giving greater mixing of flows. The protrusion is only for an outer fraction of the vessel, with the central portion remaining unobstructed.

Figure 3:
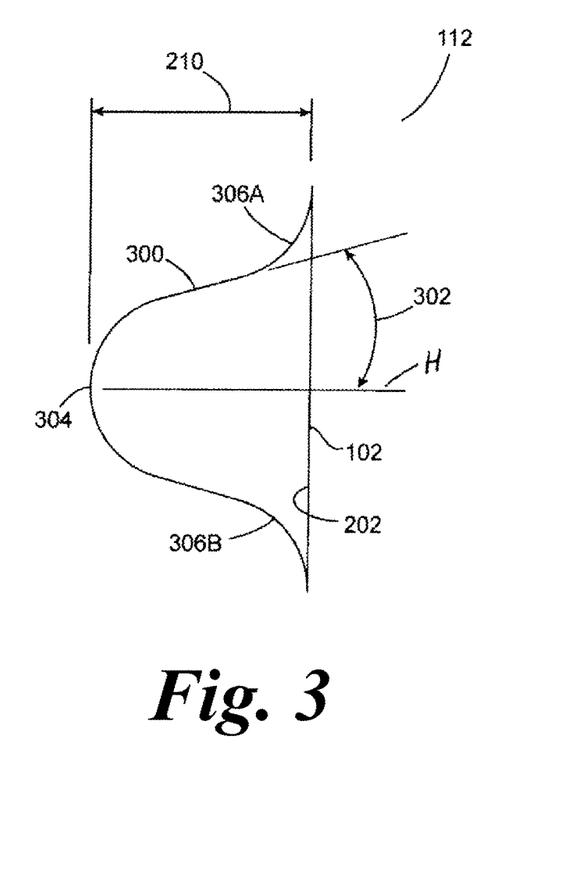
FIG. 3 is a diagrammatic cross-sectional side view of a protrusion on the radiation reactor of FIG. 2.

Referring now to FIG. 3, the helically-shaped protrusion 112 comprises a substantially wedge-shaped cross-section, which is a length of a triangular prism arranged in a helical shape to form a helically-shaped triangular prism. The helically-shaped triangular prism preferably comprises an upper face 300 which forms an angle of between 110° and 90° with the inner wall 202 of the tubular casing 102. Thus the angle 302 between the upper face 300 of the helically-shaped protrusion 112 and horizontal H is between 0° and 20°, and is preferably as close to 0° as possible whilst allowing some draft angle to facilitate removal from the mould during manufacture. The helically-shaped protrusion 112 may be advantageously formed with a rounded innermost point 304 and arcuate transitions 306A, 306B adjacent the abutment point with the inner wall 202 of the casing 102.

As mentioned hereinabove, in use, the advantage of providing the helically-shaped protrusion 112 with a substantially wedge-shaped cross-section is that the helically-shaped protrusion 112 can be used to interrupt a first direction of rotation of the fluid flowing through the ultra-violet radiation reactor 100 and divert, urge and propel the fluid back towards the ultra-violet light source 106 and away from the inner wall 202 of the casing 102. In this way, the flow rate of the fluid travelling adjacent the inner wall 202 of the casing 102 is decreased relative to prior art solutions, and the flow rate of the fluid travelling adjacent the longitudinal axis 212 of the casing 102 is increased relative to prior art solutions. Transit time and UV dose for fluid adjacent the wall is increased, resulting in higher overall effectiveness. This allows for a better dosing of the fluid with the radiation emitted from the radiation element, which is the ultra-violet light source 106 in the embodiments given in this specification, but will be readily understood to encompass any type of emitter which emits a wavelength suitable for carrying out a sanitising, cleansing, treating or other such effect on the fluid passing through the reactor 100, 200.

Figure 4:
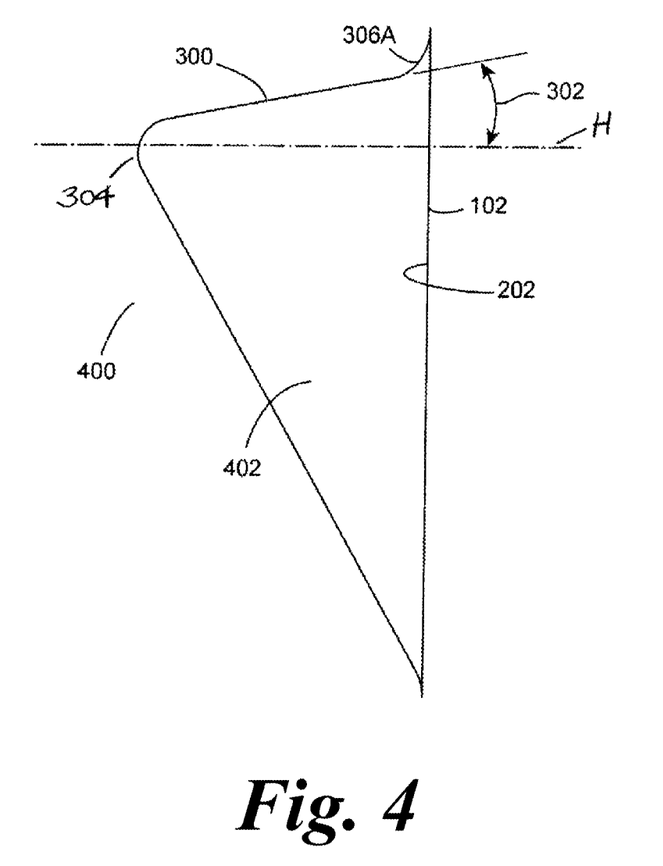
FIG. 4 is a diagrammatic cross-sectional side view of a portion of a helically-shaped protrusion in accordance with a further embodiment of the present invention.

With reference to FIG. 4, wherein like parts previously described have been assigned the same reference numerals, there is provided a further embodiment of a helically-shaped protrusion indicated generally by reference numeral 400. The helically-shaped protrusion 400 is intended to be used where the general direction of flow of the fluid passing through the ultra-violet radiation reactor 100 is downward relative to the substantially wedge-shaped cross-section, whereby an upper face 300 of the helically-shaped protrusion 400 is arranged at an angle of between 110° and 90° from the inner wall 202 of the casing 102. Thus the angle 302 between the upper face 300 of the helically-shaped protrusion 400 and the horizontal is between 0° and 20°, and is preferably at an angle of 15°.

The helically-shaped protrusion 400 may be advantageously formed with a pointed innermost edge 304 and an upper arcuate transition surface 306A adjacent the upper abutment point with the inner surface 202 of the casing 102. A lower portion 402 of the helically-shaped protrusion 400 is extended below the upper face 300 to allow for easier manufacture of the helically-shaped protrusion 400 where the helically-shaped protrusion 400 is formed through moulding of the tubular casing 102.

It will be understood that in the case where the general direction of flow of the fluid passing through the ultra-violet radiation reactor 100 is upward, as the fluid inlet 108 is adjacent a bottom of the casing 102 and the fluid outlet 110 is adjacent a top of the casing 102, the construction of the helically-shaped protrusion 400 would be reversed so that a lower face (not shown) of the helically-shaped protrusion would be arranged at an angle of between 110° and 90° from the inner wall 202 of the casing 102, and an upper portion of the helically-shaped protrusion would be extended upwards away from the lower face to improve the efficiency of the ultra-violet radiation reactor by avoiding stagnation of the fluid above the helically-shaped protrusion.

It will be understood that the helically-shaped protrusion 112 need not be formed by an indentation in the casing 102. In the present embodiment, the casing 102 is constructed from mouldable plastics material and forming an indentation to create the helically-shaped protrusion 112 is easily achievable. If the casing 102 is constructed form other materials, a partial helicoid surface which does not extend completely between the inner wall 202 of the casing 102 and the protective sleeve 104, or, a spiral-type surface, may be advantageously used instead of the helically-shaped indentation 112. For example, if the casing 102 is constructed from stainless steel, a stainless steel spiral may be affixed to an inner surface having substantially the same dimensions as hereinbefore indicated so as to urge and propel the fluid travelling through the substantially tubular casing 102 back towards the longitudinal axis 212 of the casing 102. It will also be understood that the helical protrusion may be a continuous protrusion arranged along a helical path, or the helical protrusion may be a plurality of discrete protrusions arranged along a helical path which still act to interrupt the first direction of rotation of the fluid and create a good mixing effect in the radiation reactor 100.

Figure 5:
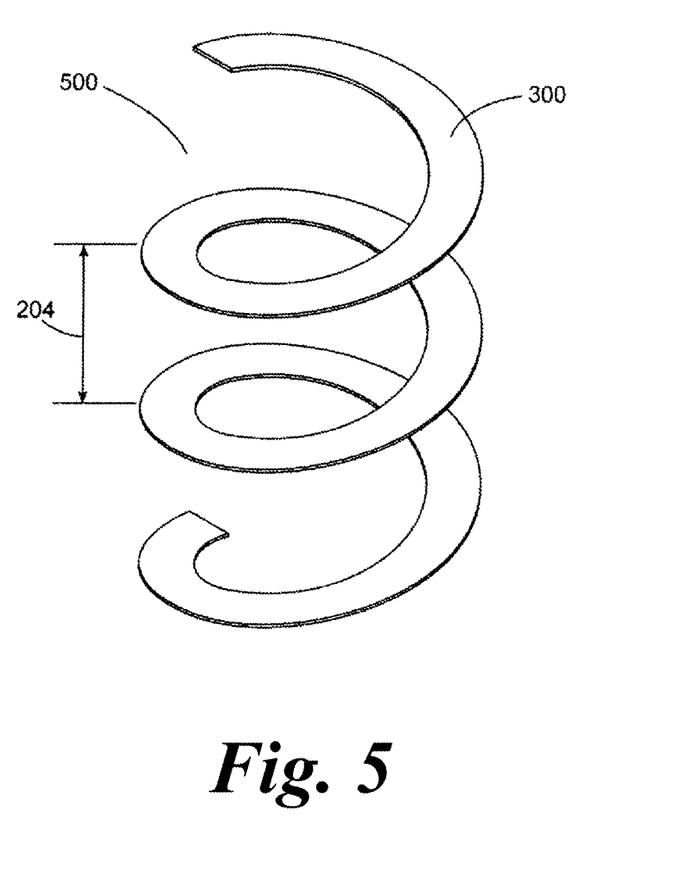
FIG. 5 is a diagrammatic perspective view of a helically-shaped protrusion in accordance with a further embodiment of the present invention.

Referring now to FIG. 5, wherein like parts previously described have been assigned the same reference numerals, there is provided a helically-shaped continuous fin-shaped surface indicated generally by reference numeral 500. The helically-shaped continuous fin-shaped surface 500 comprises an upper face 300 which is arranged at an angle of between 110° and 90° from an inner surface of a tubular casing. Thus the angle between the upper face 300 of the helically-shaped continuous fin-shaped surface 500 and the horizontal is between 0° and 20°. The helically-shaped continuous fin-shaped surface 500 may be retro-fit into an existing straight-walled tubular ultra-violet reactor casing, such as are found in the prior art and primarily constructed from stainless steel. The helically-shaped continuous fin-shaped surface 500 will be arranged with a counter-flow direction which will interrupt the first direction of flow of the fluid passing through the radiation reactor and will encourage mixing within the reactor casing.

Figure 6:
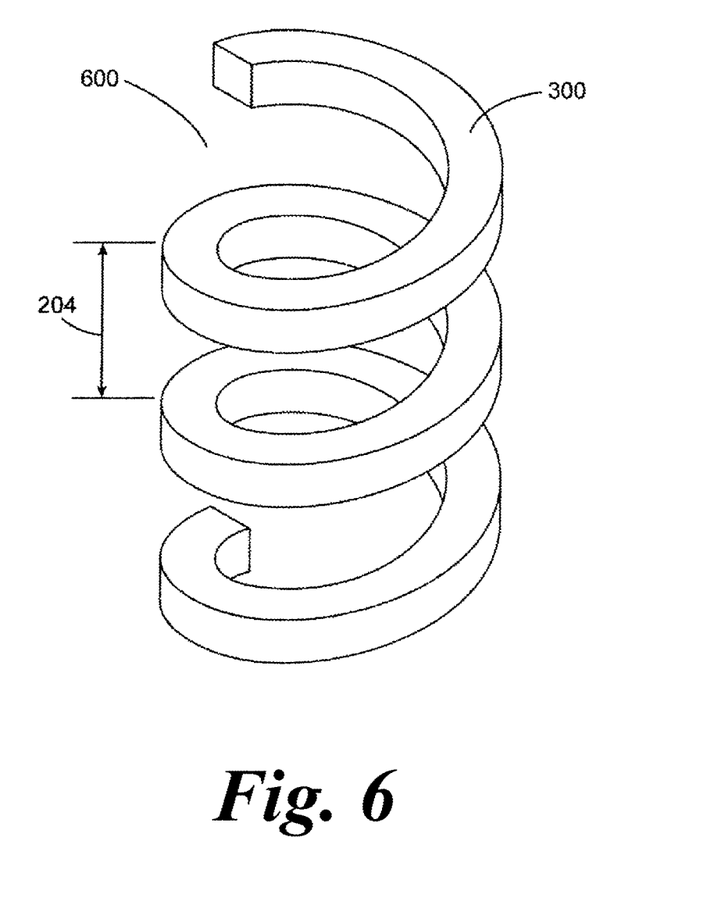
FIG. 6 is a diagrammatic perspective view of a helically-shaped protrusion in accordance with yet a further embodiment of the present invention.

With reference to FIG. 6, wherein like parts previously described have been assigned the same reference numerals, there is provided a helically-shaped square bar indicated generally be reference numeral 600. The helically-shaped square bar 600 comprises an upper face 300 which forms an angle of between 110° and 90° from an inner surface of a casing of an ultra-violet reactor into which the helically-shaped square bar 600 may be retro-fit. As before, the angle between the upper face 300 of the helically-shaped square bar 600 and the horizontal is between 0° and 20°. In accordance with one of the principles of the present invention, the helically-shaped square bar 600 will be arranged so as to form a counter-flow effect against the first direction of rotational flow of fluid passing through the ultra-violet reactor whereby mixing will thusly be encouraged within the reactor casing.

It will be understood that the helically-shaped continuous fin-shaped surface 500 and the helically-shaped square bar 600 may be retro-fit into an existing ultra-violet reactor casing, or may be formed as part of an ultra-violet reactor casing at point of manufacture.

In a further embodiment, and as mentioned hereinabove, it will be appreciated that the helically-shaped protrusion 112 need not be a continuous protrusion as shown, but rather may be made up of a plurality of discrete protrusions which are arranged in a helical pattern on an inner wall 202 of the casing 102.

Generally speaking in the present invention, if the pitch 204 of the helically-shaped protrusion 112 is too long (which is to say the distance between turns is too long) or the depth 210 of the helically-shaped protrusion 112 is too small, then the effect of the helically-shaped protrusion 112 is minimal as the helically-shaped protrusion will not sufficiently interrupt the direction of rotational flow so as to cause mixing. Conversely, if the pitch 204 of the helically-shaped protrusion 112 is too fine (which is to say the distance between turns is too short), or the depth 210 of the helically-shaped protrusion 112 is too great, then fluid passing through the ultra-violet reactor 100 will tend to stagnate in the helically-shaped protrusion 112, as the protrusions 112 act as a barrier or dam against the flow of the fluid, which in turn results in similar problems experienced by straight-walled, narrower ultra-violet reactors known from the prior art.

Whilst the term "protrusion" has been used throughout the specification, it will be readily understood that a rifling of the tubular casing may be used in place of the protrusion, provided that the direction of rifling opposes the direction of rotation of the fluid passing through the tubular casing, so as to cause a better mixing effect and consequently better radiation effect within the tubular casing.

In general, in order to facilitate better mixing within the radiation reactor 100, counter-flow protrusions/indentations are provided on an inner wall of the tubular casing of the reactor so as to interrupt the rotational flow of the fluid passing through the reactor and cause the better mixing of the fluid particles within the reactor, which allows the fluid particles to be exposed to and dosed by the radiation element, such as the ultra-violet lamp. A relatively efficient flow rate through the reactor may still be maintained.

The terms "comprise" and "include", and any variations thereof required for grammatical reasons, are to be considered as interchangeable and accorded the widest possible interpretation.

It will be understood that the components shown in any of the drawings are not necessarily drawn to scale, and, like parts shown in several drawings are designated the same reference numerals.

The invention is not limited to the embodiments hereinbefore described which may be varied in both construction and detail with the scope of the appended claims.

What is claimed is:

1. A radiation reactor for a fluid, whereby the radiation reactor comprises a tubular casing and a radiating element, with the radiation element being arranged within the tubular casing such that a substantially annular space is created intermediate the radiating element and an inner wall of the tubular casing;

the tubular casing further comprising a fluid inlet and a fluid outlet, whereby a fluid is passed into the substantially annular space of the tubular casing through the fluid inlet and the fluid is discharged from the substantially annular space of the tubular casing through the fluid outlet, with the fluid being irradiated by the radiating element within the tubular casing as the fluid passes through the substantially annular space of the tubular casing from the fluid inlet towards the fluid outlet;

wherein a first direction of rotation is imparted to the fluid as it is passed into the substantially annular space of the tubular casing;

the tubular casing comprising at least one protrusion on the inner wall, said protrusion extending into the substantially annular space;

characterised in that, the fluid inlet is arranged tangentially to the tubular casing so as to impart the first direction of rotation to the fluid; and the protrusion interrupts the first direction of rotation imparted to the fluid by the tangentially arranged fluid inlet so as to direct the fluid out of the first direction of rotation.

2. The radiation reactor for a fluid as claimed in claim 1, wherein the protrusion is a helical protrusion, and the direction of rotation of the helical protrusion opposes the first direction of rotation imparted to the fluid so as to interrupt the first direction of rotation imparted to the fluid.

3. The radiation reactor for a fluid as claimed in claim 2, wherein the helical protrusion is a plurality of discrete protrusions arranged along a helical path.

4. The radiation reactor for a fluid as claimed in claim 1, wherein the protrusion extends into the substantially annular space by a distance which is in the range of 35% to 55% of the distance intermediate the radiating element and an inner wall of the tubular casing.

5. The radiation reactor for a fluid as claimed in claim 1, wherein the protrusion is a helically-shaped triangular prism.

6. The radiation reactor for a fluid as claimed in claim 5, wherein the helically-shaped triangular prism comprises an upper face which forms an angle of between 90° and 110° with the inner wall of the tubular casing, and, a lower face which forms an angle of between 10° and 30° with the inner wall of the tubular casing.

7. The radiation reactor for a fluid as claimed in claim 1, wherein the radiation reactor is arranged within a rainwater treatment apparatus comprising an inlet filter, an aerator, an outlet filter and the radiation reactor.

8. The radiation reactor for a fluid as claimed in claim 2, wherein a pitch of the helical protrusion shortens along the length of the tubular casing from the fluid inlet towards the fluid outlet.

9. The radiation reactor for a fluid as claimed in claim 2, wherein a pitch of the helical protrusion is substantially equal to the distance intermediate an innermost point of the protrusion and a diametrically opposed point on the inner wall of the tubular casing.

10. The radiation reactor for a fluid as claimed in claim 1, wherein the radiating element is an elongated ultra-violet lamp and the fluid is rainwater which is to be partially sanitised by ultra-violet radiation from the elongated ultra-violet lamp.

11. A method for irradiating a fluid using a radiation reactor, whereby the radiation reactor comprises a tubular casing and a radiating element, with the radiation element being arranged within the tubular casing such that a substantially annular space is created intermediate the radiating element and an inner wall of the tubular casing, the method comprises the steps of:
feeding the fluid into the substantially annular space within a tubular casing through a fluid inlet, wherein a first direction of rotation is imparted to the fluid as it is fed into the substantially annular space of the tubular casing, the first inlet arranged tangentially to the tubular casing so as to impart the first direction of rotation to the fluid;
irradiating the fluid using the radiating element within the tubular casing as the fluid passes through the substantially annular space of the tubular casing from the fluid inlet towards a fluid outlet; and
discharging the fluid from the substantially annular space of the tubular casing through the fluid outlet;
characterised in that, the method further comprises the step of:
interrupting the first direction of rotation imparted to the fluid via the tangentially arranged fluid inlet by using at least one protrusion on an inner wall of the tubular casing whereby the protrusion extends into the substantially annular space so as to direct the fluid out of the first direction of rotation.

12. The method for irradiating a fluid using a radiation reactor as claimed in claim 11, wherein the protrusion is a helical protrusion, and the direction of rotation of the helical protrusion opposes the first direction of rotation imparted to the fluid so as to interrupt the first direction of rotation imparted to the fluid.

13. The method for irradiating a fluid using a radiation reactor as claimed in claim 12, wherein the helical protrusion is a plurality of discrete protrusions arranged along a helical path.

14. The method for irradiating a fluid using a radiation reactor as claimed in claim 11, wherein the protrusion extends into the substantially annular space by a distance which is in the range of 35% to 55% of the distance intermediate the radiating element and an inner wall of the tubular casing.

15. The method for irradiating a fluid using a radiation reactor as claimed in claim 11, wherein the protrusion is a helically-shaped triangular prism.

16. The method for irradiating a fluid using a radiation reactor as claimed in claim 15, wherein the helically-shaped triangular prism comprises an upper face which forms an angle of between 90° and 110° with the inner wall of the tubular casing, and, a lower face which forms an angle of between 10° and 30° with the inner wall of the tubular casing.

17. The method for irradiating a fluid using a radiation reactor as claimed in claim 12, wherein a pitch of the helical protrusion shortens along the length of the tubular casing from the fluid inlet towards the fluid outlet.

18. The method for irradiating a fluid using a radiation reactor as claimed in claim 12, wherein a pitch of the helical protrusion is substantially equal to the distance intermediate on innermost point of the protrusion and a diametrically opposed point on the inner wall of the tubular casing.

* * * * *